United States Patent [19]

Takahashi et al.

[11] 3,843,850

[45] Oct. 22, 1974

[54] FOUR CHANNEL RECORD REPRODUCING APPARATUS WITH MUTING OF SPEAKERS NOT USED FOR STEREO OR MONAURAL RECORDS

[75] Inventors: Nobuaki Takahashi, Yamato-City; Katsuhiro Ohnuki, Tokyo; Yoshitoshi Fujita, Fujisawa-City; Yasuo Itoh, Tokyo, all of Japan

[73] Assignee: Victor Company of Japan Ltd., Yokohama, Japan

[22] Filed: June 23, 1971

[21] Appl. No.: 155,760

[30] Foreign Application Priority Data

| | | |
|---|---|---|
| June 26, 1970 | Japan | 45-63190[U] |
| July 5, 1970 | Japan | 45-66596[U] |
| May 22, 1971 | Japan | 45-41555[U] |
| July 5, 1970 | Japan | 45-58312 |
| Sept. 1, 1970 | Japan | 45-75971 |

[52] U.S. Cl. .................... 179/100.4 ST, 179/1 GQ, 179/100.1 TD, 179/100.4 M

[51] Int. Cl. .......................... G11b 3/00, G11b 3/78

[58] Field of Search ............ 179/100.4 ST, 100.4 D, 179/100.1 TD, 100.4 M, 1 G, 1 GA, 1 GP, 1 GQ, 15 BT; 325/364, 64, 478; 360/27, 61

[56] References Cited

UNITED STATES PATENTS

| | | | |
|---|---|---|---|
| 2,849,540 | 8/1958 | Hamann | 179/100.1 TD |
| 3,067,292 | 12/1962 | Minter | 179/100.4 ST |
| 3,401,237 | 9/1968 | Takayanagi | 179/100.4 ST |
| 3,631,345 | 12/1971 | Wycoff | 325/364 |
| 3,632,886 | 1/1972 | Scheiber | 179/100.4 ST |
| 3,643,167 | 2/1972 | Mayle | 325/364 |
| 3,679,832 | 7/1972 | Halpern | 179/15 BT |
| 3,686,471 | 8/1972 | Takahshi | 179/100.4 ST |
| 3,708,631 | 1/1973 | Bauer et al. | 179/100.1 TD |

FOREIGN PATENTS OR APPLICATIONS

| | | | |
|---|---|---|---|
| 1,059,007 | 2/1967 | Great Britain | 179/15 BT |

*Primary Examiner*—Raymond F. Cardillo, Jr.

[57] ABSTRACT

A phonograph or similar apparatus reproduces a four channel record on which is recorded a multiplex signals of a direct wave signal and an angle modulated wave signal. One channel monaural or two channel stereo records, on only which a direct wave signal is recorded may also be played back on the same phonograph. The reproducing apparatus has a circuit for detecting the carrier component of the angle modulated wave signal included in a reproduced signal. An objective operating circuit is operated when an output is detected by the detecting circuit. Responsive to the objective operating circuit, a muting circuit, an indication circuit, a high frequency compensation circuit etc. are operated to convert the phonograph to the playing back of conventional records.

9 Claims, 9 Drawing Figures

INVENTORS
NOBUAKI TAKAHASHI
KATSUHIRO OHNUKI
YOSHITOSHI FUJITA
YASUO ITOH
By Louis Bernat ATTY.

INVENTORS
NOBUAKI TAKAHASHI
KATSUHIRO OHNUKI
YOSHITOSHI FUJITA
YASUO ITOH

By *Louis Bernat* ATTY.

INVENTORS
NOBUAKI TAKAHASHI
KATSUHIRO OHNUKI
YOSHITOSHI FUJITA
YASUO ITOH

By Louis Bernat ATTY.

INVENTORS
NOBUAKI TAKAHASHI
KATSUHIRO OHNUKI
YOSHITOSHI FUJITA
YASUO ITOH

By Louis Bernat ATTY.

FOUR CHANNEL RECORD REPRODUCING APPARATUS WITH MUTING OF SPEAKERS NOT USED FOR STEREO OR MONAURAL RECORDS

This invention relates to a four channel phonograph record reproducing apparatus and, more particularly, to a reproducing apparatus which reproduces signals from a four channel record in which four channel signals are recorded in a single sound groove of a record, by using multiplex signals of a direct wave signal and an angle modulated wave signal. Objective operating circuits in the reproducing apparatus are operated in response to the detection of a carrier component of the angle modulated wave included in the reproduced signals.

The applicant of the present application has proposed, in United States patent application Ser. No. 92,803 filed Nov. 25, 1970, entitled SYSTEM FOR RECORDING AND/OR REPRODUCING FOUR CHANNEL SIGNALS ON A RECORD DISC, now U.S. Pat. No. 3,686,471, a system and an apparatus in which sum signals and difference signals are formed by each two channels. A multiplex signal is formed by multiplexing the difference signal, which is angle modulated, and the sum signal which is a direct wave. The resultant signal is recorded on one wall of the sound groove. Therefore, four channel signals are recorded on and reproduced from the two walls of the single sound groove.

On the other hand, prior art systems have used either a monaural record or a two channel stereo record on which one channel signal or two channel signals are recorded by using only a direct wave signal. These systems do not have an angle modulated wave signal. The monaural record is the same as the two channel stereo record in that it uses only the direct wave signal. In the description made hereinbelow, therefore, reference will be made only to the two channel stereo record for comparison with the four channel record. The reproducing apparatus for the four channel record (which is recorded by the proposed recording system) is capable of reproducing the conventional two channel stereo record. In other words, this reproducing apparatus is compatible for the reproduction of either a two channel record or a four channel record.

Inasmuch as the four channel record reproducing apparatus has a circuit construction which is capable of reproducing both four channel record and two channel record, there arises a necessity for causing some objective parts of the circuit to operate differently when the four channel record is reproduced and when the two channel record is reproduced.

A muting circuit is one of the objective operating parts in the circuit where different modes of operation are required. During reproduction from the two channel record, the muting circuit cuts off, as described in detail later, a signal transmission system for either an angle modulated wave or its demodulated wave. The muting permits these waves to pass during reproduction from the four channel record. By employing this muting circuit, a transmission of an undesirable noise component during reproduction of the two channel record is prevented. The signal is reproduced with a large signal to noise ratio.

As another objective operating circuit, a detector circuit indicates when a four channel record (or a two channel record) is being reproduced. By employing this indication circuit, the kind of record which is being reproduced is easily recognized.

Another objective operative circuit is a circuit which reinforces or compensates the level in high frequencies of each channel signal during reproduction of the four channel record. This circuit is required due to an attenuation of the level in high frequencies of the demodulated signal of the angle modulated wave.

In this invention, a signal operates the objective operating circuits, when a difference in the mode of operation is required. This signal is obtained by detecting the carrier component of the angle modulated wave, which only the four channel record has. Responsive to this detected carrier component, the objective operating circuits can be accurately operated during reproduction of the four channel record.

A general object of the invention is to provide a novel and useful four channel record reproducing apparatus, which is capable of reproducing both the four channel record and a conventional two channel record. This reproducing apparatus automatically changes over the operation of the objective operating circuits or when the four channel record is reproduced and the period during which the two channel record is reproduced.

Another object of the invention is to provide a four channel record reproducing apparatus which automatically changes over the operation of the objective operating circuits responsive to the carrier component of the angle modulated wave, which is detected during reproduction of the four channel record.

Still another object of the invention is to provide a four channel record reproducing apparatus having a detecting circuit which detects the carrier component accurately and without being affected by an external disturbing noise.

A further object of the invention is to provide a four channel record reproducing apparatus having a muting circuit which is operated in response to the detected carrier component, which allows a demodulated signal to pass during reproduction of the four channel record, and which interrupts a signal during reproduction of the two channel record.

A further object of the invention is to provide a four channel record reproducing apparatus having an indication circuit which is operated in response to the detected carrier component and which indicates when the four channel record is being reproduced.

A still further object of the invention is to provide a four channel record reproducing apparatus having a circuit which is operated in response to the detected carrier component and which compensates the level in high frequencies of a reproduced signal, only during reproduction of the four channel record.

Other objects and features of the invention will become more apparent from the description made hereinbelow with reference to the accompanying drawings, in which.

Figures 1, 2:
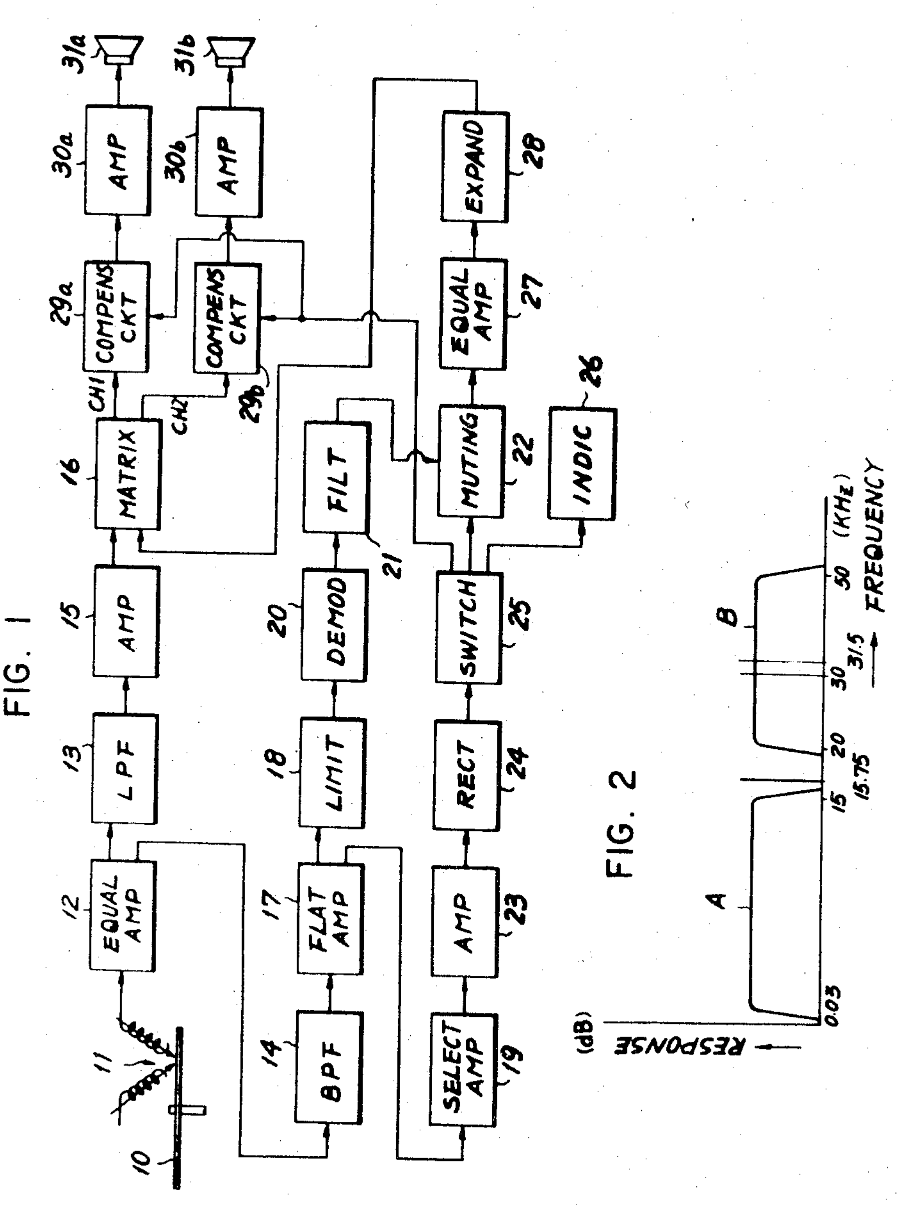
FIG. 1 is a block diagram showing one embodiment of a reproducing apparatus according to the invention.
FIG. 2 is a diagram showing a frequency response of a multiplex signal picked up from the four channel record.

First, one embodiment of the reproducing apparatus, according to the invention, will be described with reference to FIG. 1.

In a recording system of a four channel record, first and second channel signals are matrixed to obtain a sum signal and a difference signal. This difference signal is angle modulated. The angle modulated wave difference signal and the direct wave sum signal are multiplexed into a single multiplex signal. Third and fourth channel signals are likewise multiplexed into a single multiplex signal. Each of these two multiplex signals is respectively recorded on each of two walls of a groove of a four channel record 10.

The multiplex signal formed from the first and the second channels is reproduced by a pick-up 11, from one wall of the groove of the four channel record 10, and supplied to an equalizing amplifier 12. This reproduced signal is, as shown in FIG. 2, the multiplex signal of a direct wave sum signal A having a band of 30 Hz to 15 KHz and an angle modulated difference signal B having a band of 20 KHz to 50 KHz. A center frequency of the carrier of this angle modulated wave is 30 KHz. The multiplex signal formed from the third and fourth channels is reproduced by the pick-up 11, from the other wall of the four channel record 10, and is also supplied to an equalizing amplifier (not shown) in a circuit which is of the entirely same system as the block system of FIG. 1. This circuit system for the third and fourth channels is identical with the circuit system shown in FIG. 1, so that the illustration and description thereof will be omitted.

The signal equalized and amplified by the equalizing amplifier 12 is supplied to a low-pass filter 13 and a band-pass filter 14. The direct wave sum signal A, having a band of 30 Hz to 15 KHz, is filtered through the low-pass filter 13 which has an upper limit frequency of 15 KHz. Signal A is amplified in an amplifier 15 and then is supplied to a matrix circuit 16.

On the other hand, the angle modualted wave difference signal B having a band of 20 KHz to 50 KHz is filtered through the band-pass filter 14, which has a band of 20 KHz to 50 KHz. Signal B is amplified in a flat amplifier 17 and then is supplied to a limiter 18 and a selective amplifier 19. The angle modulated wave difference signal, which has been limited in amplitude in the limiter 18, is demodulated in a demodulator 20. A carrier component is remoced from the demodulated difference signal in a filter 21. The demodulated difference signal is supplied to a muting circuit 22.

The selective amplifier 19 has a tuning circuit having a tuning frequency of 30 KHz, with a high quality factor. The carrier component taken out by the selective amplifier 19 is amplified in an amplifier 23. Then, it is converted into a DC voltage, being rectified in a rectifier 24. The output from the rectifier 24 is supplied to a switching circuit 25, which effects switching action in response thereto. The switching action of the switching circuit 25 causes a control voltage to be supplied respectively to a muting circuit 22, an indication lamp circuit 26, and high-frequency compensation circuits **29*a* and 29*b*.**

The muting circuit 22 permits, as described later, the output from the filter 21 to pass, only when it receives a voltage applied in accordance with the switching action of the switching circuit 25. The demodulated difference signal from the filter 21, which has passed the muting 22, is supplied to an equalizing amplifier 27, in which it is equalized and amplified. The difference signal which has been equalized and amplified is expanded in an expander 28. Then, it is supplied to the matrix circuit 16. The expander 28 is provided with characteristics which correspond to and compensate for a compressor which is provided in the recording system. If a compression and expansion system is not adopted in the recording and reproducing system, the expander 28 may be omitted.

In the matrix circuit 16, the sum signal from the amplifier 15 and the difference signal from the expander 28 are matrixed. The first channel signal CH 1 and the second channel signal CH 2 are taken out as its outputs. The first channel signal CH 1 and the second channel signal CH2 are respectively supplied to the high frequency compensation circuits **29*a* and 29*b*, in which they are compensated with a level in high frequencies. The signals thus compensated, with a level in high frequencies, are amplified in amplifying circuits 30*a* and 30*b*, and then supplied respectively to speakers 31*a* and 31*b* in which the signals are reproduced and sounded. The high frequency compensation circuits 29*a* and 29*b* respectively operate, as described later, upon receiving a voltage applied in response to the switching action of the switching circuits 25. These circuits 29** compensate for the high frequency characteristics of the signals passing through them.

The speaker **31*a* is placed at the front left, and the speaker 31*b*** at the rear left with respect to a listener. The speakers for the third and fourth channels (not shown) are respectively placed at the front right and rear right, with respect to the listner.

The indication lamp circuit 26 operates only when it receives a voltage applied in response to the switching of the switching circuit 25 as described later. When this circuit operates, an indication lamp or other signal 26 is turned on, thereby indicating that a four channel record is being played.

The operation of the system, when a two channel stereo record or a monaural record 10 is used will be nextly described. The signal reproduced from the pick-up 11 is a direct wave component only. It does not include a modulated wave signal component. Accordingly, the signal reproduced from the pick-up 11 is supplied to the matrix circuit 16 through the equalizing amplifier 12, the lowpass filter 13, and the amplifier 15.

No signal passes through the band-pass filter 14, so that the carrier component is not taken out by the selective amplifier 19, and the switching circuit 25 is not operated. As a result, the indication lamp circuit 26 is not operated to turn on the indication lamp. This indicates that a conventional record is being played and that a four channel record is not being played. The muting circuit 22 and the high frequency compensation circuit 29 do not operate at this time.

The signal supplied to the matrix circuit 16, from the amplifier 15, appears at the output side as the first and second channels. The corresponding sounds are reproduced from the speaker 31a and 31b.

Figure 3:
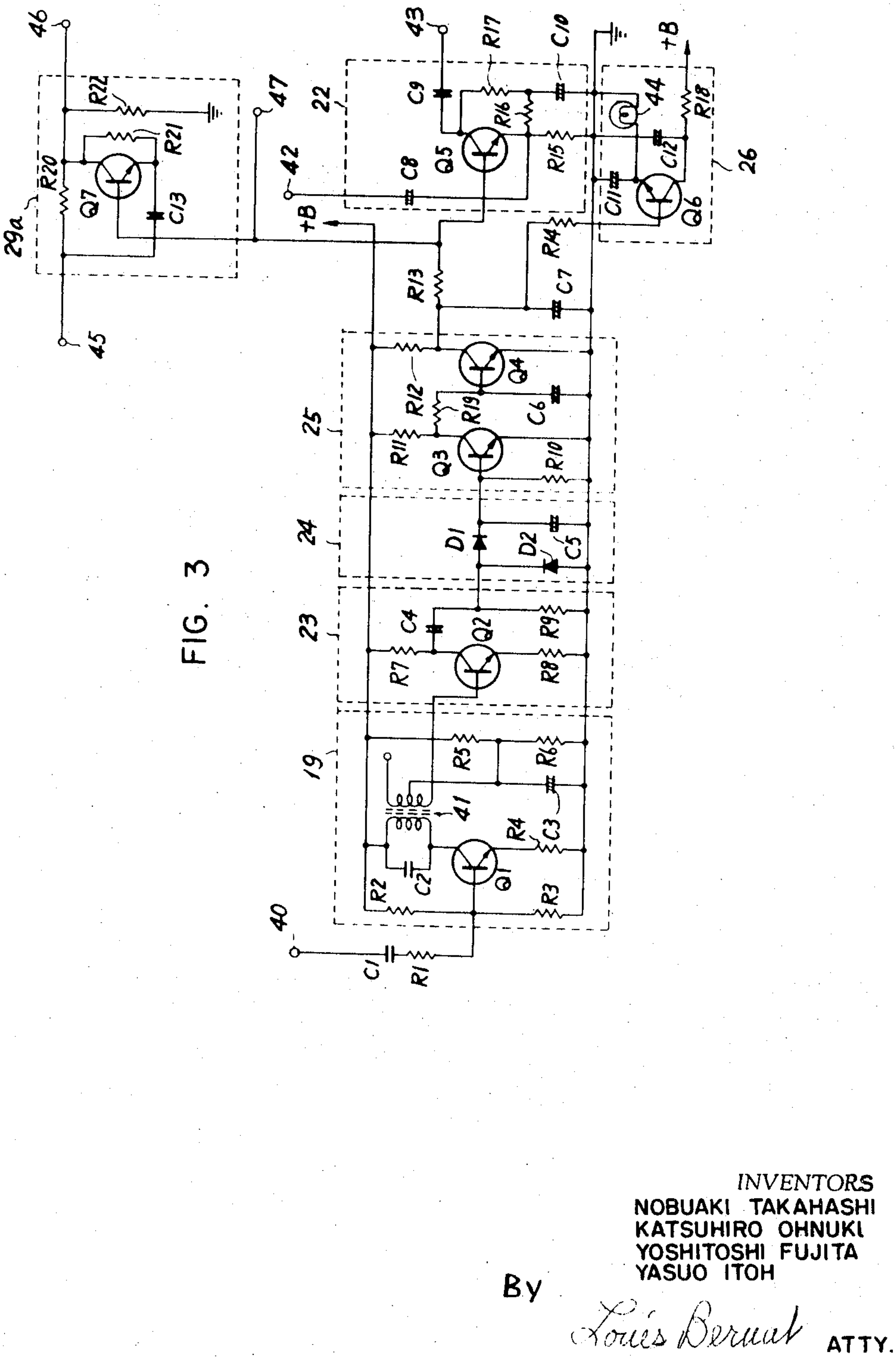
FIG. 3 is a circuit diagram showing one embodiment of a specific electric circuit constructions of essential blocks in the block diagram shown in FIG. 1.

Next to be described are the concrete circuit constructions and their operations of the essential parts of the apparatus according to the invention (see FIG. 3 and the subsequent figures). In the circuit shown in FIG. 3, various blocks are enclosed by broken lines correspond to the blocks in the block diagram of the system shown in FIG. 1, and they are designated by the same reference numeral, as is used in FIG. 1.

The signal applied to a terminal 40 from the flat amplifier 17 is supplied to the base of a transistor $Q_1$ of the selective amplifier 19, the circuit extending through a capacitor $C_1$ and a resistor $R_1$. The collector output from the transistor $Q_1$ is supplied to the base of a transistor $Q_2$ of the amplifier 23, through a tuning circuit 41. A carrier component of 30 KHz is taken out in the tuning circuit 41.

In recording, a carrier frequency is used in angle modulating the difference signal. This carrier cannot have a very high frequency, due to the limitation in the capacity of a pick-up and a record to reproduce high frequency. Also, the carrier frequency cannot be a very low frequency because the lower limit of the band of the angle modulated wave must be outside of the upper limit of the band of the direct wave. In view of these restrictions, the carrier frequency used in angle modulating the difference signal in the recording system is selected at 30 KHz.

It is to be noted, however, that this center carrier frequency of 30 KHz is in close proximity to a second harmonics frequency 31.5 KHz of a horizontal oscillation frequency (15.75 KHz) of a horizontal oscillator, in a television receiver. As a result, if there is a television receiver which is receiving television signals near the four channel record reproducing apparatus, the aforementioned second harmonics is mixed with the angle modulated wave band (20 KHz to 50 KHz). Accordingly, if only the angle modulated wave is detected, the switching circuit 25 makes a faulty operation when the second harmonics exceeding the switching level of the switching circuit 25 is applied thereto. The switching circuit 25 may also make a faulty operation, if any apparatus other than the horizontal oscillator (such as a conventional two channel stereo reproducing apparatus) generates higher harmonics. This higher harmonic component, having a high level, is mixed with the angle modulated wave band extending from 20 KHz to 50 KHz.

Figure 4:
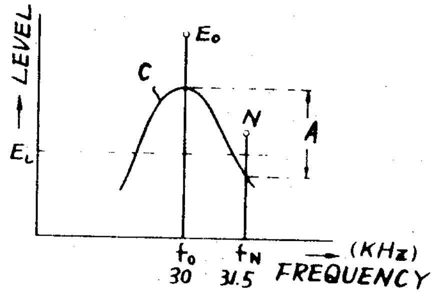
FIG. 4 is a diagram showing a selection characteristic of a tuning circuit of a selective amplifier.

This phenomenon will be described with reference to FIG. 4. The level at which the switching circuit 25 performs a switching operation is denoted by a reference symbol $E_i$. In case the second harmonics N (its frequency $f_N = 31.5$ KHz) having a higher level than the level $E_i$ is generated in the horizontal oscillator, it is mixed with the angle modulated wave band. The system which detects only the existence of the modulated carrier detects the second harmonics component even when there is no angle modulated wave, resulting in an erroneous operation of the switching circuit.

In view of the foregoing, the apparatus of the present embodiment has a tuning circuit 41 (FIG. 3) which has a tuning point at the carrier frequency $f_o$ (30 KHz). It has a high quality factor, in its selection characteristic. A selection curve C of the tuning circuit 41 has a tuning point of 30 KHz. The selection curve C further has a characteristic such that the selection amplified level at this tuning point, is above the operating level $E_i$; whereas the amplified level at a frequency of 31.5 KHz is below the operating level $E_i$.

Consequently, the carrier frequency of 30 KHz passes through the selective amplifier 19, at a level above the operating level. The second harmonics N passes through the selective amplifier 19 at a level below the operating level. Therefore, there will not be erroneous operation of the switching circuit even if the second harmonics of a horizontal oscillation frequency of the television receiver is mixed with the angle modulated wave band.

The carrier component thus taken out in the selective amplifier 19 is supplied to the base of the transistor $Q_2$ of the amplifier 23. The transistor $Q_2$ is of an emitter follower configuration having a high input impedance. The signal amplified at the transistor $Q_2$ is rectified in the rectifying circuit 24, which consists of diodes $D_1$ and $D_2$ and a capacitor $C_5$. The signal is converted into an output DC voltage from the rectifying circuit 24 applied to the base of a transistor $Q_3$ of the switching circuit 25.

The carrier component taken out by the selective amplifier 19 and applied to the transistor $Q_3$ is above the operating level of the transistor $Q_3$. Accordingly, the transistor $Q_3$ which was in a non-conductive state becomes conductive when the DC voltage is applied thereto from the rectifying circuit 24. When the transistor $Q_3$ becomes conductive, its collector voltage drops. This causes a drop in the base voltage of a transistor $Q_4$, which is connected to the collector of the transistor $Q_3$ through a resistor $R_{23}$. This drop brings the transistor $Q_4$ into a non-conductive state.

When the transistor $Q_4$ is brought into a nonconductive state, voltage is applied to the base of a transistor $Q_5$ of the muting circuit 22, through resistors $R_{12}$ and $R_{13}$. This brings the transistor $Q_5$, which was in a non-conductive state, into a conductive state. When the transistor $Q_5$ becomes conductive, the demodulated difference signal, which has been supplied from the filter 21 to a terminal 42, becomes an output signal at a terminal 43. This signal path extends through a capacitor $C_8$, the transistor $Q_5$ and a capacitor $C_9$. Accordingly, when the carrier component is taken out by the selective amplifier 19 and the switching circuit 25 performs the switching operation, the muting circuit 22 is brought into a state in which a signal passes through the circuit. This causes the demodulated difference signal from the terminal 42 to pass through the muting circuit 22 and to be supplied to the equalizing amplifier 27.

While the four channel record is not being reproduced or, even during reproduction of the four channel record, the pick-up traces a soundless groove. No angle modulated wave exists in the reproduced signal, and no carrier component is taken out by the selective amplifier 19. During this period of time the transistor $Q_5$ of the muting circuit 22 is in a non-conductive state. The muting circuit 22 is in a state in which the signal cannot pass through the circuit. Consequently, a noise component which has been supplied, from the band-pass filter 14 through the filter 21, to the muting circuit 22 is interrupted at the muting circuit 22. This noise is not transmitted to the equalizing amplifier 27 and the subsequent circuit.

When the carrier component is detected, the transistor $Q_4$ of the switching circuit 25 becomes nonconductive. Voltage is applied to the base of a transistor $Q_6$ of the indication lamp circuit 26, through resistors $R_{12}$ and $R_{14}$. This brings the transistor $Q_6$, which was in a non-conductive state, into a conductive stage. As the transistor $Q_6$ becomes conductive, electric current flows in an indication lamp 44, via a resistor $R_{18}$, and the indication lamp 44 is turned on. The lighting of the indication lamp 44 indicates that the four channel record is being played. During reproduction from a two channel record, the lamp 44 is not lighted.

Figure 5:
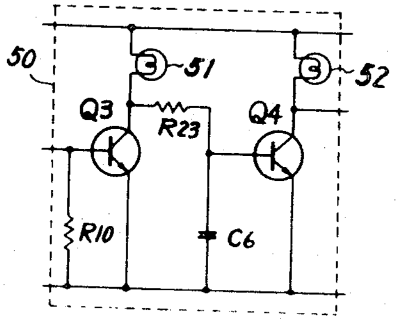
FIG. 5 is circuit diagram showing one embodiment of a switching and indication lamp circuit.

Instead of the indication lamp circuit 26, a signaling circuit, which serves both as a switching circuit and as an indication lamp circuit, may be provided as shown in FIG. 5. In FIG. 3 and FIG. 5, the same reference numerals designate the same component parts or elements. FIG. 5 illustrates a switching and indication lamp circuit 50. In this circuit 50 (FIG. 5), the collectors of the transistors $Q_3$ and $Q_4$ are connected to indication lamps 51 and 52. The resistors $R_{11}$ and $R_{12}$ may also be connected to these collectors, as shown in circuit 25 of FIG. 3.

When the carrier component is taken out in the selective amplifier 19 and the transistor $Q_3$ becomes conductive, electric current flows in the lamp 51 (FIG. 5) whereby the lamp 51 is turned on. At this time, the transistor $Q_4$ is in a non-conductive state, and electric current does not flow in the lamp 52. Accordingly, the lamp 52 is not lighted. If the lamp 51 is used for indicating the four channel playback and the lamp 52 is used for indicating the two channel playback, a lighting of the lamp 51 by the above described operation indicates that the four channel record is being played.

During a playing of the two channel record, no carrier component is taken out in the selective amplifier 19. The transistor $Q_3$ is in a non-conductive state, whereas the transistor $Q_4$ is in a conductive state. As a result, the lamp 51 is not lighted, and the lamp 52 is lighted. The lighting of the lamp 52 indicates that the two channel record is being played.

The high frequency compensation circuits 29*a* and 29*b* will be further described. Since both of the high frequency compensation circuits 29a and 29b have entirely the same construction, FIG. 3 illustrates the high frequency compensation circuit 29*a* only, and an illustration of the high frequency compensation circuit 29*b* is omitted. The terminal 47 is provided for supplying a control voltage to the high frequency compensation circuit 29*b*.

Figure 6:
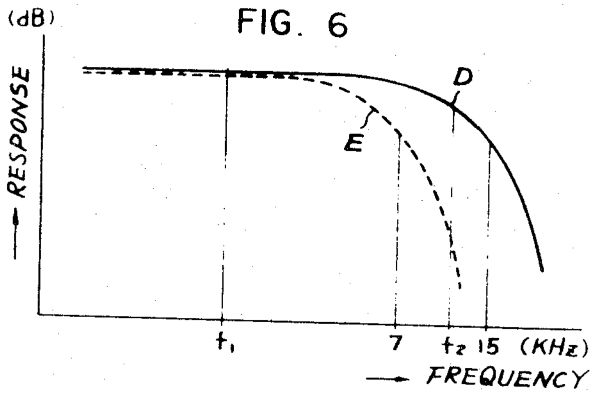
FIG. 6 is a diagram showing frequency characteristics of a reproduced sum signal and a reproduced and demodulated difference signal.

In FIG. 6, the characteristics of the reproduced sum signal and reproduced demodulated difference signal are respectively shown by curves D and E. The characteristic of the reproduced sum signal D is 30 Hz to 15 KHz. The characteristic of the reproduced demodulated difference signal E is 30 Hz to 7 KHz. As will be apparent from the characteristic shown in FIG. 6, the level of the difference signal E does not extend to the high frequencies, but decreases sharply at a low frequency.

This characteristic is considered in terms of energy. First to be explained is the situation at a frequency $f_1$, at which the difference signal E is reproduced in a flat characteristic (a frequency sufficiently smaller than 7 KHz). Energy is considered in respect of the first channel. The output of the first channel is developed at the first channel output terminal CH1 of the matrix circuit 16 (FIG. 2), but not at the second channel output terminal CH2. The output voltage of the matrix circuit 16 is represented as V, the impedance of the speakers 31*a* and 31*b* as Z, and the powers which the speakers 31*a* and 31*b* receive as $P_a$ and $P_b$. The powers $P_a$ and $P_b$ are $$\left.\begin{aligned} P_a &= V^2/Z \\ P_b &= 0 \end{aligned}\right\} \quad (1)$$

Again, the situation considered is a frequency at which the attenuation of the difference signal is great (for example, a frequency $f_2$ in FIG. 6). Inasmuch as the difference signal is very small, it is assumed that there is a relationship of (CH 1 − CH 2) = 0. An equal amount of signal CH 1 is developed at both output terminals of the matrix circuit 16. The amount of the signal CH 1 is half the amount of the signal developed at the first channel output terminal of the matrix circuit 16, in the above described case. Accordingly, the output of an equal amount of V/2 is developed at both output ends of the amplifiers 30*a* and 30*b*. The powers $P_a'$ and $P_b'$ which the speakers 31*a* and 31*b* receive are $$\left.\begin{aligned} P_a' &= (V/2)^2/Z = ¼\ V^2/Z \\ P_b' &= (V/2)^2/Z = ¼V^2/Z \end{aligned}\right\} \quad (2)$$

Consequently, $P_a' + P_b' = ½V^2/Z$. . The total power is half the total power $P_a + P_b = V^2/Z$ obtained from the equation 1. From the foregoing, it will be understood that the reproduced demodulated differend signal decreases in its energy in high frequencies.

In view of the above, the high frequency compensation circuit 29*a* includes resistors $R_{20}$ to $R_{22}$, a capacitor $C_{13}$ and a transistor $Q_7$. The resistor 29 is connected between a terminal 45 and an output terminal 46. The output first channel signal CH 1 from the matrix circuit 16 is supplied to terminal 45. A signal is transmitted from terminal 46 to the amplifier 30*a*. The collector of the transistor $Q_7$ is connected to a point between the resistor 20 and the terminal 45. The base of the transistor $Q_7$ is connected between the resistor $R_{13}$ and the base of the transistor $Q_5$. The capacitor $C_{13}$ is connected between the junction of the resistor 20 and the terminal 45, and the emitter of the transistor $Q_7$.

When, as described above, the selective amplifier 19 detects the carrier component, and the transistor $Q_4$ becomes non-conductive. A voltage is applied to the base of the transistor $Q_7$ and to the base of the transistor $Q_5$. This brings the transistor $Q_4$ into a conductive state, thereby connecting the capacitor $C_{13}$ substantially in parallel with the resistor $R_{20}$. Consequently, the level in high frequencies of the signal passing through the high frequency compensation circuit 29*a* is compensated.

Figures 7, 8:
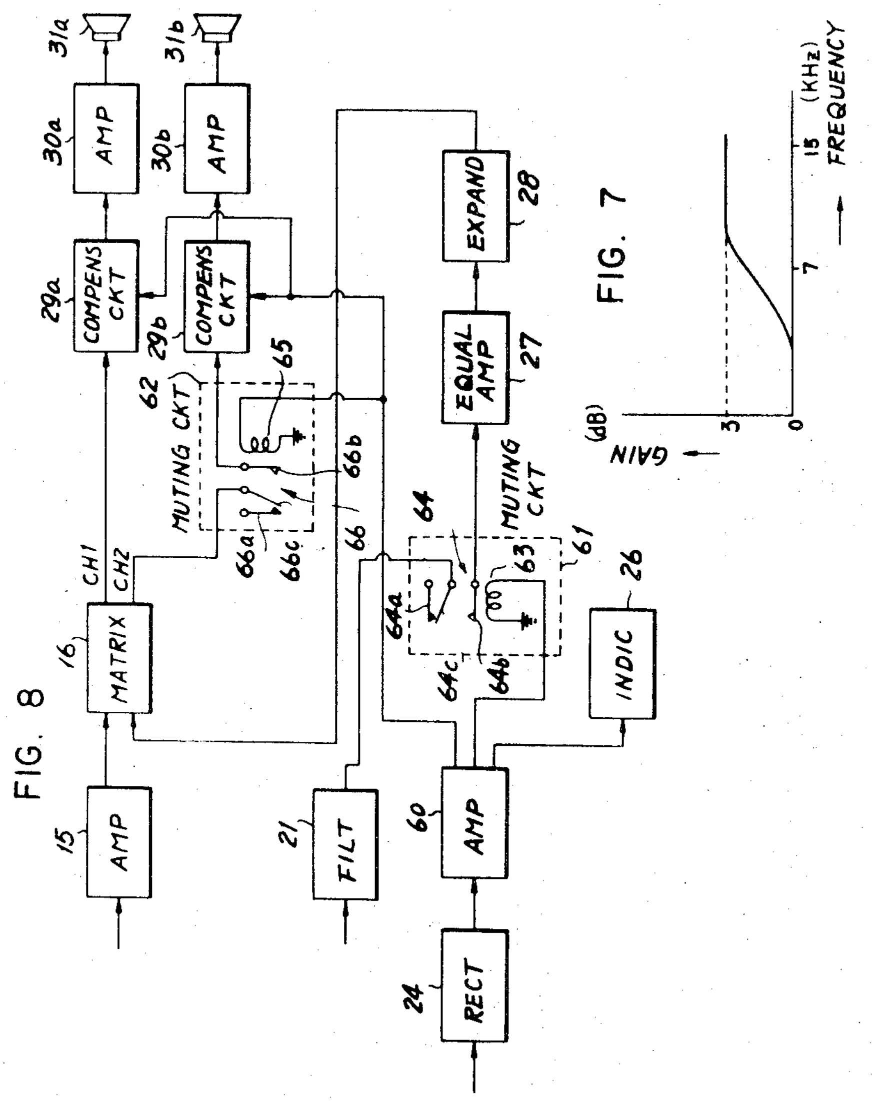
FIG. 7 is a diagram showing a frequency characteristic of a high frequency compensation circuit.
FIG. 8 is a block diagram of the essential part of a reproducing system including another embodiment of the muting circuit.

The high frequency compensation circuit 29*a* has a frequency characteristic as shown in FIG. 7. The characteristic is flat in low frequencies. The characteristic is also flat in high frequencies but is increased by 3 dB approximately at a frequency of 7 KHz. In consequence, the signal which has passed the high frequency compensation circuit 29*a* has its voltage raised by about 3 dB in high frequencies, where the difference signal as described above is not reproduced. At this time, at the frequency $f_1$ in FIG. 6, $$P_a = V^2/Z$$
$$P_b = 0$$

At the frequency $f_2$, $$\left.\begin{aligned} P_a' &= (V/\sqrt{2})^2/Z = (V^2/2)/Z \\ P_b' &= (V/\sqrt{2})^2/Z = (V^2/2)/Z \end{aligned}\right\} \quad (4)$$

Accordingly, $$P_a + P_b = V^2/Z$$

$$P_a' + P_b' = (V^2/2)/Z + (V^2/2)/Z = V^2/Z = P_a + P_b$$

The above equation shows that the sum of the outputs from the two speakers at the frequency $f_1$ is equal to that at the frequency $f_2$. From this, it is understood that response in high frequencies is compensated.

In the foregoing embodiment, the high frequency compensation circuits 29*a* and 29*b* are provided in the systems of the output first channel and the output second channel of the matrix circuit 16. The invention is not limited to this arrangement but the high frequency compensation circuit may be provided at a former stage of the matrix circuit 16. In this case, the high frequency compensation circuit is connected to the output end of the amplifier 15. By this arrangement, there is an increase in the level in high frequencies of the direct wave sum signal in which response does not sharply decrease in the high frequencies. This compensates the level in high frequencies of the outputs from the output first and second channels of the matrix circuit 16. As to the difference signal, response in high frequencies sharply decreases. Accordingly, the increasing of the difference signal in high frequencies only results in an increase of noise, and no advantageous effect can be expected. For this reason, the high frequency compensation circuit should preferably be provided in the system of the sum signal. Accordingly, in case the high frequency compensation (increasing) circuit is provided at a former stage of the matrix circuit 16, only one of such circuit is required.

Constants of the circuit elements shown in FIG. 3 are as follows:

Resistors

| | |
|---|---|
| R1 | 22KΩ |
| R2 | 560KΩ |
| R3 | 18KΩ |
| R4 | 470Ω |
| R5 | 330KΩ |
| R6 | 33KΩ |
| R7 | 5.6KΩ |
| R8 | 680Ω |
| R9 | 1KΩ |
| R10 | 150KΩ |
| R11 | 220KΩ |
| R12 | 68KΩ |
| R13 | 100KΩ |
| R14 | 12KΩ |
| R15 | 10KΩ |
| R16 | 33KΩ |
| R17 | 100KΩ |
| R18 | 300Ω |
| R19 | 12KΩ |
| R20 | 3.3KΩ |
| R21 | 100KΩ |
| R22 | 6.8KΩ |

Capacitors

| | |
|---|---|
| C1 | 0.015F |
| C2 | 0.0022F |
| C3 | 1μF/50V |
| C4 | 1μF/50V |
| C5 | 1μF/50V |
| C6 | 1μF/50V |
| C7 | 1μF/50V |
| C8 | 4.7μF/25V |
| C9 | 4.7μF/25V |
| C10 | 4.7μF/25V |
| C11 | 1μF/50V |
| C12 | 4.7μF/50V |
| C13 | 4700PF |

In the muting circuit 22, the indication lamp circuit 26 and the high frequency compensation circuit 29*a* (29*b*) of the foregoing embodiment, the transistors Q5, Q6 and Q7 operate when a carrier component is used. These transistors, however, may be replaced with the same effect by relays which perform the same function.

Another embodiment of the muting circuit is shown in FIG. 8. In FIG. 1 and FIG. 8, the same reference numerals designate the same component parts or elements and description thereof will be omitted. A DC voltage is obtained from a rectifying circuit 24 and amplified in an amplifier 60. Thereafter, the voltage is supplied to an indication lamp circuit 26, high compensation circuits 29*a* and 29*b*, and muting circuits 61 and 62. As in the above described embodiment, the indication lamp circuit 26 lights the lamp, when it is supplied with the DC voltage. Also, the high frequency compensation circuits 29*a* and 29*b* compensate the levels in high frequencies of the signals passing through these circuits 29*a* and 29*b*.

The muting circuits 61 and 62 include relays which are respectively connected between the amplifier 60 and an equalizing amplifier 27, and between the matrix circuit 16 and the high frequency compensation circuit 29*b*. When a relay coil 63 of the muting circuit 61 is actuated by the DC voltage supplied from the amplifier 60, a movable contact member 64c of a relay switch 64 (connected to the filter 21) is switched from an open contact 64*a* to a contact 64*b*, which is connected to the equalizing amplifier 27. Accordingly, the reproduced demodulated difference signal, from the filter 21, supplied to the equalizing amplifier 27 through the relay switch 64.

During reproduction from a two channel record, the relay coil 63 is not actuated. Accordingly, the movable contact member 64*c* of the relay switch 64 is connected to the open contact 64*a*, so that the relay switch 64 is opened. Therefore, noise component from the filter 21 is not transmitted to the equalizing amplifier 27 and the subsequent circuits.

A relay coil 65, of the muting circuit 62, is actuated by the DC voltage directly supplied from the amplifier 60. A movable contact member 66*c* of a relay switch 66, connected to the second channel output terminal of the matrix circuit 16, is switched from an open contact66*a* to a contact 66*b* which is connected to the high frequency compensation circuit 29*b*. Accordingly, the second channel output signal, from the matrix circuit 16, is supplied to the high frequency compensation circuit 29b through the relay switch 66.

During reproduction from a two channel record, the relay coil 65 is not actuated. Accordingly, the movable contact member 66*c*, of the relay switch 66, is connected to the open contact 66*a*, so that the relay switch 66 is opened. Therefore, the output signal from the second channel side of the matrix circuit 16 is not transmitted to the speaker 31*b*. During reproduction from the two channel record, the output signal from the terminal of the first channel of the matrix circuit 16 is the same as the signal from the terminal of the second channel of the same circuit. If the muting circuit 62 is not provided in the system, the same sounds are simultaneously sounded from the speakers 31*a* and 31*b*. These speakers are arranged respectively in front of and behind the listener, so that a correct sound field is not formed. In the present embodiment, however, the muting circuit 62 is provided. Accordingly, the muting circuit 62 interrupts the output signal from the second channel terminal of the matrix circuit 16, during the reproduction from the two channel record. This signal is not sounded from the speaker 31*b* for the second channel. In this case, therefore, the signal is sounded only from the speaker 31*a* disposed in front of the listener, whereby a correct sound field is formed.

If the muting circuit 62 is provided on the output side of the matrix circuit 16, the high frequency compensation circuit 29*b* is not necessarily a circuit which is operated by the detected carrier component. In this case, the circuit 29*b* may be a high frequency compensation circuit in which no active elements are used, but the level in high frequencies is always compensated by passive elements only.

Figure 9:
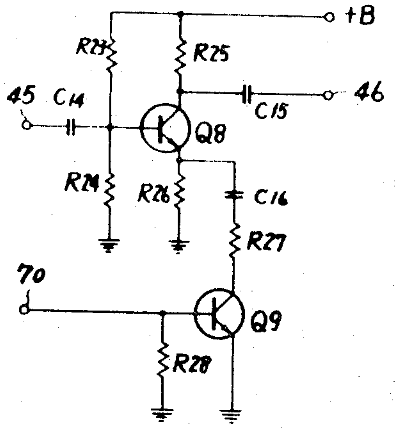
FIG. 9 is a circuit diagram of another embodiment of the high frequency compensation circuit.

A circuit diagram of another embodiment of the high frequency compensation circuit 29*a* (29*b*) is shown in FIG. 9. The output signal from the matrix circuit 16 is applied to the base of a transistor $Q_8$ through a terminal 45 and a capacitor $C_{14}$. The collector output of the transistor $Q_8$ is taken out of an output terminal 46 through a capacitor $C_{15}$. To the emitter of the transistor $Q_8$, there is connected a resistor $R_{26}$. The voltage from the junction between the resistor $R_{13}$ and the base of the transistor $Q_5$ shown in FIG. 3 is applied to the base of a transistor $Q_9$, through a terminal 70. The emitter of the transistor $Q_9$ is grounded. A capacitor $C_{16}$ and a resistor $R_{27}$ are connected in series between the collector of the transistor $Q_9$ and the emitter of the transistor $Q_8$.

When the selective amplifier 19 detects the carrier component, the transistor $Q_4$ becomes non-conductive as previously described. Voltage is applied to the base of the transistor $Q_9$ through the terminal 70. When the transistor $Q_9$ becomes conductive, the capacitor $C_{16}$ and the resistor $R_{27}$ are connected in parallel with the resistor $R_{26}$. In consequence, the series circuit of capacitor $C_{16}$ and the resistor $R_{27}$ is connected in parallel with the resistor $R_{26}$, between the emitter of the transistor $Q_8$ and the ground. Accordingly, the impedance of the emitter load of the transistor $Q_8$ decreases in high frequencies, and the gain of the transistor $Q_8$ increases. As a result, the signal which passes through the transitor $Q_8$, at this time is taken out of the output terminal 46 and is increased or compensated in the level in high frequencies.

Circuit constants of the elements shown in FIG. 9 are as follows:

| | |
|---|---|
| Resistors | |
| **R23** | 220KΩ |
| **R24** | 100KΩ |
| **R25** | 3.3KΩ |
| **R26** | 3.3KΩ |
| **R27** | 6.8KΩ |
| **R28** | 100KΩ |
| Capacitors | |
| **C14** | 100μF |
| **C15** | 100μF |
| **C16** | 2200PF |

This invention is not limited to the above described embodiments but many modifications and variations may be made without departing from the spirit and scope of the invention.

What we claim is:

1. A phonograph record reproducing apparatus for interchangeably playing back monaural, stereo and four channel records, said monaural record having an unmodulated signal recorded in a single groove thereof, said stereo records having two unmodulated signals respectively recorded on two side walls of a single groove thereof, said four channel records having two multiplex signals respectively recorded on two side walls of a single groove thereof, one of the two multiplex signals including one unmodulated sum signal combining first and second of the four channel signals and one modulated signal paired therewith wherein a carrier signal is modulated responsive to a difference signal combining the first and second channel signals, the other of the two multiplex signals including another unmodulated sum signal combining third and fourth of the four channel signals and another modulated signal paired therewith wherein the carrier signal is modulated responsive to a difference signal combinig the third and fourth channel signals; said reproducing apparatus including two signal processing means each of which processes an associated one of the two multiplex signals, each of said signal processing means comprising separator means for separating the unmodulated sum signal and the paired modulated signal from the associated multiplex signal; demodulator means for demodulating the paired modulated signal separated by said separator means; detector means for detecting the carrier component of the paired modulated signal separated by said separator means; control signal generator means for rectifying the carrier component detected by said detector means to produce a control signal; muting circuit means connected to the output circuit of said demodulator means, means responsive to the control signal having a level exceeding a predetermined level for selectively causing the muting circuit means to pass the output signal of said demodulator means, and means responsive to the control signal having a level below the predetermined level for selectively causing the muting circuit means to interrupt the output signal of said demodulator means; matrix circuit means responsive to the output signal of said muting circuit means and the unmodulated sum signal separated by said separator means for individually providing the two channel signals paired with the demodulated signal in the associated multiplex signal.

2. The reproducing apparatus as defined in claim 1 further comprising four speakers arranged with respect to a listener so that a first speaker is placed at the front and on one side for generating sound in response to the first channel signal, a second speaker is placed at the rear and on the one side for generating sound in response to the second channel signal, a third speaker is placed at the front and on the other side for generating sound in response to the third channel signal, and a fourth speaker is placed at the rear and on the other side for generating sound in response to the fourth channel signal; and wherein each of said two signal processing means further comprises second muting circuit means controlled in response to the control signal for selectively passing the second (or the fourth) channel signal from said matrix circuit means to the second (or the fourth) speaker when the level of the control signal exceeds the predetermined level and for selectively interrupting the second (or the fourth) channel signal when the level of the control signal is below the predetermined level.

3. The reproducing apparatus as defined in claim 1 wherein each of said two signal processing means further comprises first circuit means and second circuit means having a predetermined frequency response for respectively receiving the first (or the third) channel signal and the second (or the fourth) channel signal from said matrix circuit means, the first and second circuit means respectively including circuit means responsive to the control signal for increasing the response in a high frequency range when the control signal level exceeds the predetermined level.

4. The reproducing apparatus as defined in claim 1 wherein each of said two signal processing means further comprises indication lamp circuit means for lighting a lamp in response to the control signal when its level exceeds the predetermined level and for putting out the lamp in response to the control signal when its level is below the predetermined level.

5. The reproducing apparatus as defined in claim 1 wherein each of said two signal processing means further comprises switching circuit means and indication lamp circuit means, said switching circuit means including a first switching transistor which is switched to a conductive state in response to the control signal applied to the base electrode thereof when the level of the control signal exceeds the predetermined level and which is switched to a non-conductive state when the level of the control signal is below the predetermined level, and a second switching transistor connected to be controlled by the output of the first switching transistor, said second switching transistor being switched to a non-conductive state in response to said first switching transistor when in the conductive state and switched to a conductive state in response to said first switching transistor when in the non-conductive state; said indication lamp circuit means including first and second indication lamps respectively connected to the collector electrodes of the first and second switching transistors, whereby during the reproduction of the four channel record, the first indication lamp is lighted in response to the conductive state of the first switching transistor, and during the reproduction of the one channel or two channel record, the second indication lamp is lighted in response to the conductive state of the second switching transistor.

6. A phonograph record reproduction system for interchangeably playing back monaural, stereo, and four channel records, said monaural and stereo records having unmodulated signals recorded thereon, said four channel records having modulated and unmodulated signals recorded thereon in the form of a synchronized pair of signals, one of said pair being a modulated signal and the other of said pair being an unmodulated signal, said reproduction system comprising: pick-up means, first separator means connected to said pick-up means for separating the modulated signal and the paired unmodulated signal from the signal reproduced by said pick-up means from a four channel record, first demodulator means for demodulating the modulated signal separated by said first separator means, first detector means having a tuned circuit of high selectivity with a tuned frequency which coincides with the carrier frequency of said modulated signal in order to detect the carrier frequency indicating the presence of the first modulated signal, first control signal generator means for rectifying the detected carrier frequency and producing a first control signal responsive thereto, first muting circuit means connected to the output circuit of the first demodulator means, first switching circuit means operated responsive to said first control signal for passing the output signal of said first demodulator means to the first muting circuit means during the presence of the first control signal and interrupting the output signal at the first muting circuit means when the first control signal is nonexistent, first matrix circuit means responsive to the output signal of the first muting circuit means and the synchronized unmodulated signal for individually providing first and second channel signals during the presence of the output signal of the first muting circuit means and for providing two signals responsive to the paired unmodulated signal during a nonexistence of the output signal of said first muting circuit means, second separator means for separating the second modulated signal and the paired unmodulated signal from the signal reproduced by said pick-up means, second demodulator means for demodulating the second modulated signal separated by said second separator means, second selective amplifier means having said tuned circuit associated therewith to detect the carrier frequency in response to the second modulated signal, second control signal generator means for rectifying the carrier frequency detected by said second selective amplifier means and producing a second control signal responsive thereto, second muting circuit means connected to the output circuit of the second demodulator means, second switching circuit means responsive to the second control signal for passing the output signal of the second demodulator means through the second muting circuit means during an existence of the second control signal and interrupting the output signal of the second demodulator means at the second muting circuit means during a nonexistence of the second control signal, and second matrix circuit means responsive to the output signal of the second muting circuit means and the unmodulated signal corresponding to the second modulated signal for individually providing the third channel signal and the fourth channel signal during an existence of the output signal of the second muting circuit means and providing two signals the same as the unmodulated signal corresponding to the second modulated signal during a nonexistence of the output signal of said second muting circuit means.

7. The record reproducing apparatus as defined in claim 6 further comprising first circuit means and second circuit means having a predetermined frequency response and respectively receiving the first channel signal or the unmodulated signal corresponding to the first modulated signal and the second channel signal or the unmodulated signal corresponding to the first modulated signal from the first matrix circuit means, the first and second circuit means respectively including circuit means responsive to said first control signal for increasing the response in high frequency range during the existence of the first control signal, and third circuit means and fourth circuit means having the same frequency response as that of the first and second circuit means and respectively receiving the third channel signal or the unmodulated signal corresponding to the second modulated signal and the fourth channel signal or the unmodulated signal corresponding to the second modulated signal from the second matrix circuit means, the third and fourth circuit means respectively including circuit means similar to the circuit means included in said first and second circuit means responsive to said second control signal for increasing the response in high frequency range during the existence of the second control signal.

8. The record reproducing apparatus as defined in claim 6 further comprising third muting circuit means receiving the second channel signal or the unmodulated signal corresponding to the first modulated signal from the first matrix circuit means, and fourth muting circuit means recieving the fourth channel signal or the unmodulated signal corresponding to the second modulated signal from the second matrix circuit means, wherein said first switching circuit means also passes the second channel signal through the third muting circuit means during the existence of the first control signal and interrupting the second channel signal or the unmodulated signal corresponding to the first modulated signal at the third muting circuit means during the nonexistence of the first control signal, and wherein said second switching circuit means also passes the fourth channel signal through the fourth muting circuit means during the existence of the second control signal and interrupting the fourth channel signal or the unmodulated signal corresponding to the second modulated signal at the fourth muting circuit means during the nonexistence of the second control signal.

9. The record reproducing apparatus as defined in claim 6 further comprising lamp circuit means including a lamp, wherein said first switching circuit means also pass a current through said lamp circuit means during the existence of the first control signal thereby to indicate that the four channel record is being reproduced.

* * * * *